United States Patent [19]

Fisher et al.

[11] Patent Number: 5,054,881
[45] Date of Patent: Oct. 8, 1991

[54] SUBMARINE FIBER OPTIC CABLE ASSEMBLY

[75] Inventors: William C. Fisher, Arlington, Wash.; Michael E. Bevis, Coeur d'Alene, Id.

[73] Assignee: GTE Northwest Incorporated, Everett, Wash.

[21] Appl. No.: 287,363

[22] Filed: Dec. 20, 1988

[51] Int. Cl.⁵ .............................................. G02B 6/44
[52] U.S. Cl. .................................................. 385/113
[58] Field of Search ..................................... 350/96.23

[56] References Cited

U.S. PATENT DOCUMENTS

| | | | |
|---|---|---|---|
| 3,086,369 | 4/1963 | Brown | 405/172 |
| 4,110,994 | 9/1978 | Lundh | 405/158 |
| 4,147,454 | 4/1979 | Willums | 405/156 |
| 4,160,872 | 7/1979 | Lundberg et al. | 350/96.23 X |
| 4,271,350 | 6/1981 | Crowley | 219/549 |
| 4,272,472 | 6/1981 | Hulin et al. | 264/146 |
| 4,610,505 | 9/1986 | Becker et al. | 350/96.23 |
| 4,662,712 | 5/1987 | Tabata et al. | 350/96.23 |
| 4,744,935 | 5/1988 | Priaroggia et al. | 264/103 |
| 4,763,981 | 8/1988 | Wilkins | 350/96.23 |
| 4,763,983 | 8/1988 | Keith | 350/96.23 |
| 4,765,711 | 8/1988 | Obst | 350/96.23 |
| 4,792,422 | 12/1988 | Cornelison et al. | 264/1.5 |

FOREIGN PATENT DOCUMENTS

| | | | |
|---|---|---|---|
| 52-54454 | 5/1977 | Japan | 350/96.23 |
| 53-11038 | 2/1978 | Japan | 350/96.23 |
| 56-83704 | 7/1981 | Japan | 350/96.23 |
| 59-19903 | 2/1984 | Japan | 350/96.23 |
| 60-50505 | 3/1985 | Japan | 350/96.23 |
| 60-70409 | 4/1985 | Japan | 350/96.23 |

Primary Examiner—John D. Lee
Attorney, Agent, or Firm—John A. Odozynski; Peter Xiarchos

[57] ABSTRACT

An apparatus which allows the installation of a relatively inexpensive, low-attenuation, subterranean fiber optic cable underwater is disclosed. A high-density polyethylene subduct is extruded around the fiber optic cable to form a subduct assembly which typically exhibits a weight that is less than its buoyancy in water. The subduct assembly is then transported to the point of installation along with at least one sinkable cable and a lashing wire. Dimensions of the sinkable cable are selected so that, at the point of installation, the sinkable cable is lashed to the subduct assembly to form a cable assembly having a desired weight-to-buoyancy ratio with respect to water and a desired tensile strength. Splices in the subduct assembly and the sinkable cable occur at locations in the cable assembly which are offset from one another.

25 Claims, 2 Drawing Sheets 5,054,881

SUBMARINE FIBER OPTIC CABLE ASSEMBLY

TECHNICAL FIELD OF THE INVENTION

The present invention relates generally to fiber optic cables and to the installation thereof. More specifically, the present invention relates to a fiber optic cable assembly which is specifically adapted for underwater use.

BACKGROUND OF THE INVENTION

Fiber optic cables have become a highly desirable mode of transmission for telecommunication and other signals. However, the installation of fiber optic cables presents unique problems when compared to the installation of electrical conductor cables. The metallic electrical conductors of electrical conductor cables serve the dual functions of providing electrical conductivity and providing mechanical strength. On the other hand, while the materials included in fiber optic cables provide optical conductivity, they typically provide relatively little mechanical strength when compared to a typical electrical cable. Consequently, great care must be taken when installing fiber optic cables and exposing fiber optic cables to potential disturbance to prevent fiber optic cables from breaking or otherwise becoming damaged.

Submarine, or underwater, applications present particularly troublesome problems in the successful use of fiber optic cables. In an underwater application, a cable must be sufficiently dense so that it stays at the bottom of a body of water in which it is installed. Such a cable may constantly be acted upon by forces from currents in the body of water. In addition, an underwater cable may experience major disturbances caused by setting or raising boat anchors or other everyday, human-originated activities. Thus, underwater applications typically require the use of a stronger cable than is used in a conventional subterranean, or underground, application. One conventional submarine fiber optic cable includes a fiber filled cable with double armored steel strands and jute wrapping. Such a cable has a greater density and tensile strength than a typical subterranean fiber optic cable.

While the conventional submarine fiber optic cables have been successfully used in submarine applications, they provide undesirable solutions to underwater problems. The additional processing steps required to produce a conventional submarine fiber optic cable cause it to be excessively expensive. For example, a conventional double armored submarine fiber optic cable costs approximately seven times more than an otherwise generally equivalent conventional subterranean fiber optic cable.

In addition, the metallic materials included in the conventional submarine fiber optic cable are subject to electrolysis when installed in an underwater environment. The electrolysis produces OH ions from the metallic materials. The optically transmissive components of the fiber optic cable absorb these OH ions. Over time, an undesirably high signal attenuation characteristic results. For example, a conventional submarine fiber optic cable is specified as having a 3 dB/km attenuation factor while an otherwise generally equivalent subterranean fiber optic cable is specified as having a 0.5 dB/km attenuation factor.

Moreover, the conventional submarine fiber optic cable experiences manufacturing constraints which limit the unspliced section lengths to an undesirably short maximum length, which in one example is around 9800 feet. Thus, an excessive number of splices are required to install the conventional submarine fiber optic cable over extended underwater distances. Splices are undesirable because they increase attenuation, and they require a large amount of time during installation of the cable.

Furthermore, the splicing procedure for a conventional submarine fiber optic cable is an extremely time consuming and painstaking operation when compared to a typical subterranean fiber optic cable splice. Any fiber optic cable splice is a delicate operation to insure that signal attenuation is minimized. However, an additional factor complicates the splicing of the conventional submarine fiber optic cable. Specifically, the tensile strength of the cable must be preserved across the splice. In other words, the steel strands must be spliced to preserve tensile strength, and the steel strands must be spliced in the same physical location as the optic fibers. Consequently, two delicate operations must be performed in one small area.

Therefore, a need exists for an improved submarine fiber optic cable and a method of installing a fiber optic cable underwater.

SUMMARY OF THE INVENTION

Accordingly, it is a advantage of the present invention that, when compared to a conventional submarine fiber optic cable, a less expensive submarine fiber optic cable assembly is provided.

Another advantage of the present invention is that a fiber optic cable portion of the present invention is isolated from portions of the present invention which may be subject to electrolysis. Consequently, attenuation characteristics are improved because such electrolysis has substantially no influence over operation of the fiber optic cable.

Yet another advantage is that the present invention provides a cable assembly in which splices are required less frequently, are less complicated, and can be performed more quickly than splices required for conventional submarine fiber optic cables.

The above and other advantages of the present invention are carried out in one form by a fiber optic cable which is located within a non-conductive subduct. Weight is added to the subduct to produce a cable assembly having a weight-to-buoyancy ratio which is greater than one in water. This cable assembly is then fed into a body of water.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
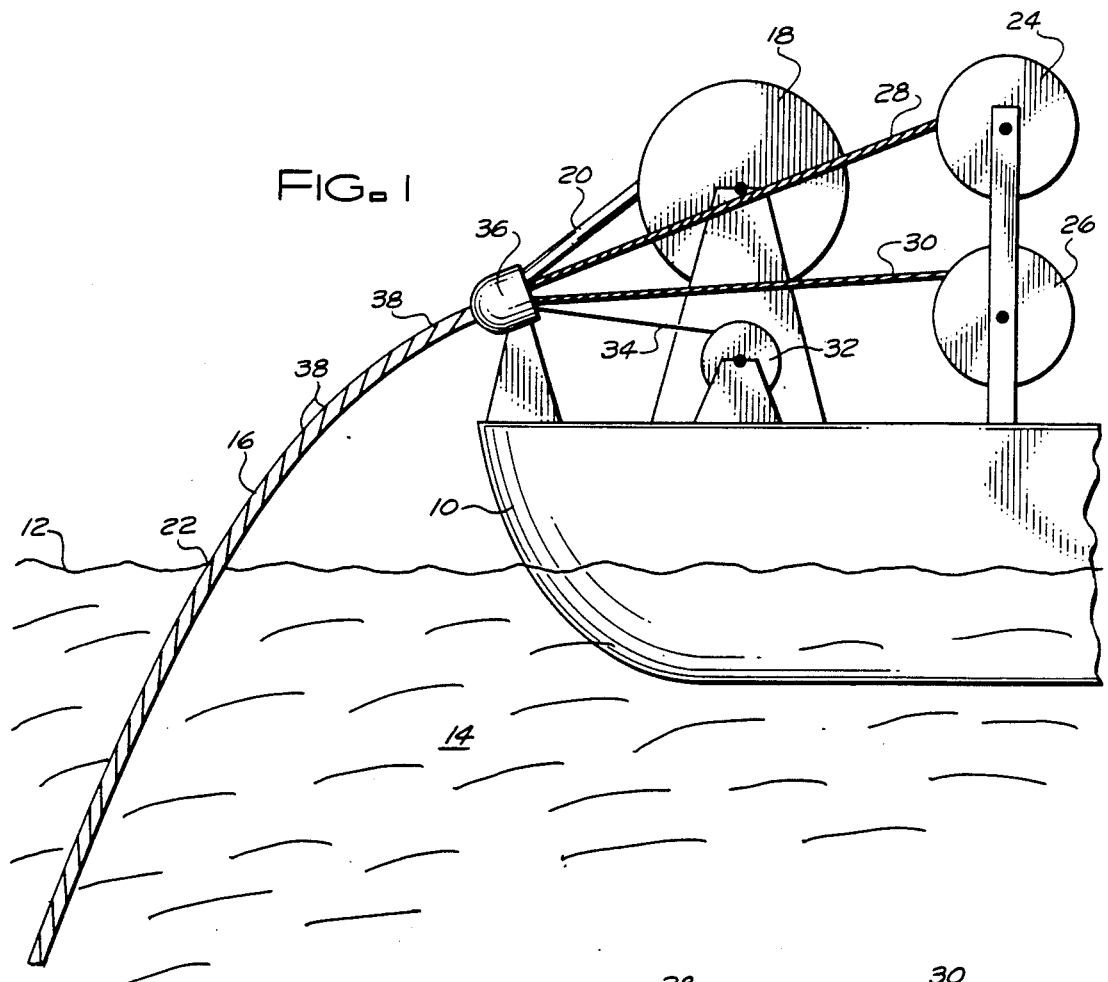
FIG. 1 shows a schematic illustration of the present invention, in which a fiber optic cable assembly is assembled and fed into a body of water.

FIG. 1 presents a schematic illustration of the present invention. In FIG. 1 a barge 10, or other floating vessel, resides on a surface 12 of a body of water 14. FIG. 1 illustrates the assembly of a cable assembly 16 and the feeding of cable assembly 16 into body of water 14, where it then becomes installed in an aqueous environment. Specifically, body of water 14 is typically fresh water, such as a lake, or salt water, such as a bay, sound, or ocean.

A spool 18, which contains an unspliced section of a subduct assembly 20, has been transported to barge 10 and to an installation point 22 in body of water 14. Of course, installation point 22 changes as ship 10 moves during the installation of cable assembly 16. Likewise, spools 24 and 26 each contain unspliced sections of sinkable cables 28 and 30, respectively. Moreover, a spool 32 has been transported to point 22, and spool 32 contains a lashing wire 34.

Each of subduct assembly 20, cables 28 and 30, and lashing wire 34 are fed into a conventional lashing device 36, which assembles these components together into cable assembly 16. Specifically, in cable assembly 16 each of sinkable cables 28 and 30 reside substantially parallel to each other and to subduct assembly 20. Subduct assembly 20, sinkable cable 28, and sinkable cable 30 are attached together by lashing wire 34, which is wound around cables 28 and 30 and subduct assembly 20 so that a multiplicity of substantially uniformly spaced revolutions 38 of lashing wire 34 surrounds subduct assembly 20, cable 28, and cable 30. This wrapping operation is performed by lashing device 36 in a conventional manner, which is known to those skilled in the art. The preferred embodiment of the present invention uses conventional settings for the number of revolutions of lashing wire 34 per unit length of cable assembly 16 and the tightness of revolutions 38.

Although in the preferred embodiment subduct assembly 20 exhibits as high a density as is reasonably and economically possible, it still exhibits a density which is less than that of body of water 14. In other words, with respect to body of water 14 subduct assembly 20 exhibits a weight-to-buoyancy ratio which is less than one. Without the addition of cables 28 and/or 30, subduct assembly 20 would float rather than sink to the bottom (not shown) of body of water 14. However, sinkable cables 28 and 30 each represent high density cables when compared to the density of water. In fact, the density of cables 28 and 30 and their overall weight are sufficiently high so that when they are combined with subduct assembly 20, the resulting cable assembly 16 exhibits a weight which is greater than the buoyancy of cable assembly 16. Consequently, with respect to body of water 14 cable assembly 16 exhibits a weight-to-buoyancy ratio which is greater than one, and cable assembly 16 sinks to the bottom of body of water 14. Moreover, this added weight to subduct assembly 20 is uniformly distributed throughout the length of cable assembly 16 so that stresses on cable assembly 16 are likewise distributed uniformly.

Sinkable cables 28 and 30 are formed using corrosion resistant materials so that their strength, weight, and density characteristics are preserved over a long period of time. Likewise, lashing wire 34 is formed from a corrosion resistant material, preferably stainless steel, so that sinkable cables 28 and 30 remain attached to subduct assembly 20 over a long period of time.

As illustrated in FIG. 1, the assembly of cable assembly 16 occurs at installation point 22. Assembly at installation point 22 is desirable because it permits the use of longer unspliced sections of subduct assembly 20 than would be possible if cable assembly 16 were assembled elsewhere. In the preferred embodiment, spool 18 represents a maximum standard size spool which is conventionally used in the installation of cables. Consequently, spool 18 contains a maximum transportable unspliced length of subduct assembly 20. In the preferred embodiment, approximately six kilometers (more than 19,000 feet) of subduct assembly 20 are wound on spool 18 prior to assembly of cable assembly 16. Since cable assembly 16 has a larger diameter than the diameter of subduct assembly 20, a shorter length of cable assembly 16 would fill such a maximum standard size spool. Consequently, longer unspliced runs of cable assembly 16 result, a signal attenuation characteristic of cable assembly 16 improves, and installation time is saved by requiring the performance of fewer splicing operations.

Figure 2:
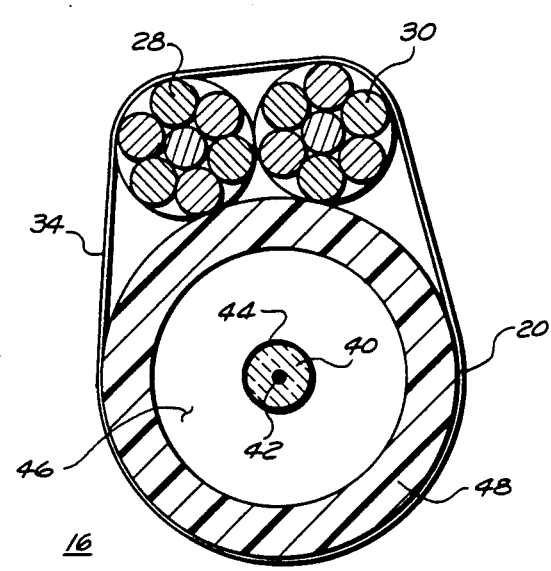
FIG. 2 shows a cross-sectional end view of the cable assembly of the present invention.
Figure 3:
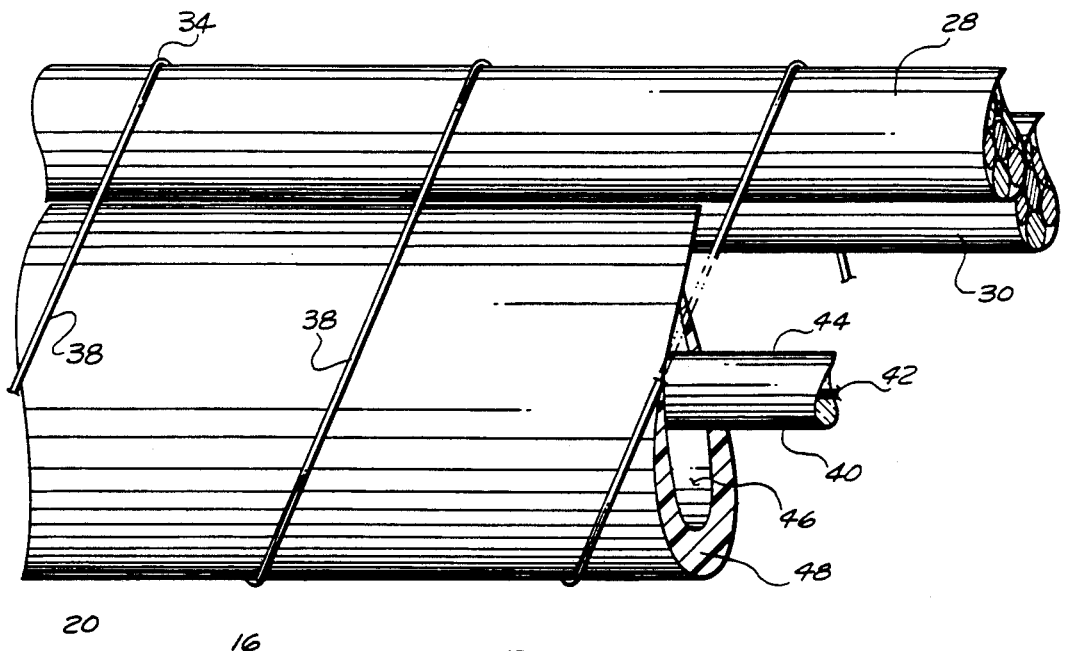
FIG. 3 shows a side-view of the cable assembly of the present invention.

FIGS. 2 and 3 show details of cable assembly 16. Specifically, FIG. 2 shows a cross-sectional end view of cable assembly 16 while FIG. 3 shows a side-view of cable assembly 16. The side-view shown in FIG. 3 depicts a cut-away portion of subduct assembly 20 that exposes a fiber optic cable 40.

Referring to FIGS. 2 and 3, the present invention contemplates the use of any fiber optic cable to serve as fiber optic cable 40. However, in order to hold the costs of cable assembly 16 as low as possible, the preferred embodiment of the present invention uses a conventional subterranean fiber optic cable. One example of such a conventional subterranean fiber optic cable is sold by the Siecor Corporation of Hickory, North Carolina under the part number 024P14-11101-00. This fiber optic cable is a single mode cable having 24 fibers in a core 42 thereof, having a jelly-filled sealing compound, and having a polyethylene sheath 44.

In addition, in order to maintain a desirably low signal attenuation characteristic of fiber optic cable 40, the conventional subterranean fiber optic cable utilized by the preferred embodiment is constructed using only materials which resist electrolysis. Specifically, fiber optic cable 40 preferably contains no substantial quantities of metallic materials. In particular, fiber optic cable 40 preferably contains no steel strands, like those included in conventional submarine fiber optic cables.

FIGS. 2 and 3 show that fiber optic cable 40 resides within an interior portion 46 of a subduct 48. Fiber optic cable 40 and subduct 48 together form subduct assembly 20, discussed above in connection with FIG. 1. In the preferred embodiment, interior 46 of subduct 48 contains only air and fiber optic cable 40. However, nothing prevents the introduction of other substances within interior 46; but, the introduction of such substances may increase the cost of cable assembly 16. Subduct 48 surrounds and encloses fiber optic cable 40 throughout the entire length of cable assembly 16.

In the preferred embodiment of the present invention, fiber optic cable 40 is located within interior portion 46 of subduct 48 during the manufacturing process of subduct 48. Specifically, subduct 48 is manufactured around an existing fiber optic cable 40 using a conventional extrusion process. In the preferred embodiment, subduct 48 is formed from a high density polyethylene resin and is dimensioned in the extrusion process to have an inside diameter of around 1.000 inch and an outside diameter of around 1.365 inches. The polyethylene material which forms subduct 48 is not conductive, and therefore subduct 20 resists electrolysis. One example of such a material and extrusion process is sold under the trademark CABLECON SDR7 by the Integral Corporation of Dallas, Tex.

The density characteristic of the polyethylene which forms subduct 48 in the preferred embodiment is as high as is reasonably and economically possible using standard manufacturing constraints. This high-density material is desirable because it is substantially impervious to water over long periods of time. Consequently, subduct 48 isolates fiber optic cable 40 from the environment outside of cable assembly 16. Although cable assembly 16 resides in a substantially aqueous environment, fiber optic cable 40 generally resides in an air environment for a long period of time after its installation.

Although subduct 48 is substantially impervious to water, over a long period of time a small quantity of water may pass through subduct 48 to interior 46, or condensation may collect in interior 46, causing fiber optic cable 40 to reside in a water environment. The mere presence of a water environment poses no serious threat to the successful operation of fiber optic cable 40. Rather, OH ions, which may be present in portions of body of water 14 (see FIG. 1) near items undergoing electrolysis, pose a threat because such OH ions can be absorbed by fiber optic cable 40 causing an increased attenuation characteristic of fiber optic cable 40.

However, the passage of water through subduct 48 is sufficiently slow so that fiber optic cable 40 remains isolated from those portions of body of water 14 (see FIG. 1) which reside immediately outside of subduct assembly 20. Specifically, subduct 48 substantially isolates fiber optic cable 40 from sinkable cables 28 and 30 and lashing wire 34, which reside immediately outside of subduct 48. Cables 28 and 30 and lashing wire 34 may be subject to electrolysis in the preferred embodiment of the present invention. However, due to the isolation provided by subduct 48, the vast majority of OH ions from such electrolysis are swept away in body of water 14 and do not pass through subduct 48 into interior 46 thereof. Thus, such OH ions are not absorbed by fiber optic cable 40, and attenuation characteristics of fiber optic cable 40 are not significantly influenced. In addition, water collected in interior 46 by condensation generally contains no OH ions, and therefore poses no serious threat to the successful operation of fiber optic cable 40.

The inside and outside diameters of subduct 48 are chosen to be as small as is reasonably and economically possible using standard manufacturing constraints. Therefore, subduct 48 exhibits an outside diameter which is preferably less than around 1.5 inches using current manufacturing techniques. This minimized diameter for subduct 48 reduces the buoyancy experienced by subduct 48, and thus reduces the requirements placed on sinkable cables 28 and 30.

In the preferred embodiment of the present invention, subduct 48 exhibits an outside diameter of around 1.365 inches. Consequently, one linear foot of subduct assembly 20 displaces 17.56 inches$^3$ of water. This displacement in fresh water creates a buoyancy, or upward force, of 0.63 pounds per foot of cable assembly 16. One foot of the subduct assembly 48 described above weighs around 0.25 pounds, and one foot of fiber optic cable 40 weighs around 0.70 pounds. Consequently, subduct assembly 20 exhibits a net buoyancy of around 0.3 pounds per foot. In order to sink cable assembly 16 in body of water 14 (see FIG. 1), sinkable cables 28 and 30 together demonstrate a weight which exceeds the buoyancy associated with cables 28 and 30 by at least 0.3 pounds per foot.

In the preferred embodiment of the present invention, sinkable cables 28 and 30 are each conventional 25 M galvanized steel strand. Such strand has a diameter of around 0.5 inches and a weight in the range of 0.400 to 0.525 pounds per foot. Thus, each of such cables experiences a buoyancy of around 0.085 pounds per foot in fresh water. The use of only one of cables 28 and 30 causes cable assembly 16 to sink in body of water 14 (see FIG. 1). However, two of the above-described steel strand are included in the preferred embodiment of the present invention so that, with respect to body of water 14, a resulting weight-to-buoyancy ratio of cable assembly 16 is significantly greater than one and is preferably at least two. A weight-to-buoyancy ratio which is significantly greater than one causes cable assembly 16 to remain in place at the bottom of body of water 14 in spite of tides or currents which cable assembly 16 may experience.

As discussed above, lashing wire 34 in the preferred embodiment is formed from stainless steel. Consequently, the density of lashing wire 34 is such that the effect of lashing wire 34 on the overall density of cable assembly 16 increases the weight-to-buoyancy ratio discussed above. In an alternate embodiment, an additional electrical conductor cable (not shown) may advantageously be lashed parallel to sinkable cables 28 and 30 outside of subduct assembly 20 by lashing wire 34. Such an electrical conductor cable serves as a backup communications link to fiber optic cable 40. The effect of such an electrical conductor cable on cable assembly 16 also increases the weight-to-buoyancy ratio discussed above.

Referring back to FIG. 1, the tensile strength of cable assembly 16 in the present invention is sufficiently high so that cable assembly 16 may be installed within body of water 14 without causing damage to cable assembly 16, and so that cable assembly 16 may be disturbed once installed in body of water 14 without causing damage to cable assembly 16. In a submarine environment, cable assembly 16 is subject to disturbance by boat anchors, physical contact with boats in shallow water, and continuous forces exerted by the movement of the water.

Specifically, in the preferred embodiment, cable assembly 16 has sufficient tensile strength so that cable assembly 16 may be picked up by a boat anchor to surface 12 of body of water 14 without causing damage to cable assembly 16. Thus, such tensile strength successfully withstands experiencing the entire weight of that portion of cable assembly 16 which is supported by a single point when such a single point is raised to surface 12. In the preferred embodiment, the 25 M steel strands 28 and 30 are the strongest components of cable assembly 16, and each exhibit a tensile strength of around 25,000 pounds. Since cables 28 and 30 reside in parallel, the preferred embodiment of cable assembly 16 exhibits a tensile strength of around 50,000 pounds. Such tensile strength is significantly greater than the tensile strength exhibited by a conventional submarine fiber optic cable, which is typically around 18,000 pounds, for improved protection of cable assembly 16 against disturbance.

Figure 4:
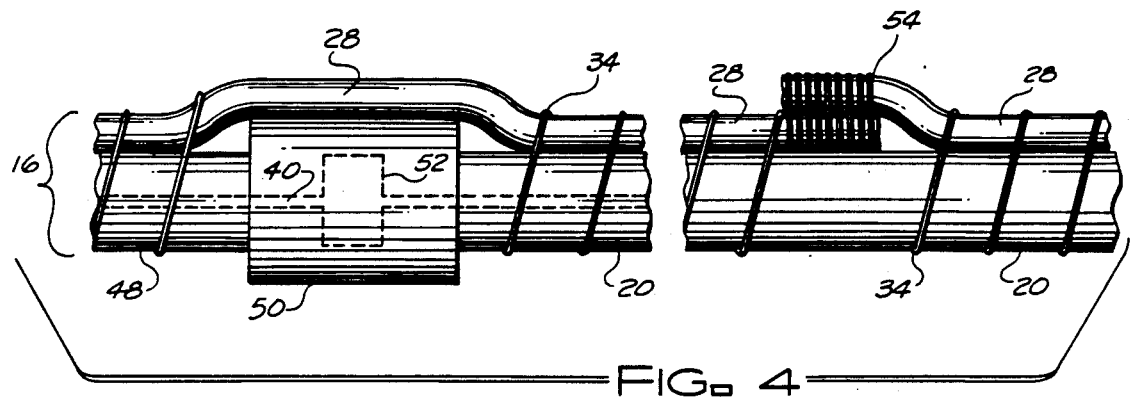
FIG. 4 shows relative locations of splices in the cable assembly of the present invention.

The length of cable assembly 16 in the present invention is from shore to shore (not shown). This length may be so long that multiple unspliced sections of subduct assembly 20 are required to span it. As is conventional in the art, such sections may be spliced together to create the needed length. FIG. 4 illustrates the relative location of such splices in cable assembly 16. Specifically, FIG. 4 shows a splice 50 in subduct 48 and a splice 52 in fiber optic cable 40. Splices 50 and 52 are formed using conventional techniques and reside at a common location along cable assembly 16. Moreover, splice 50 in subduct 48 is formed in such a manner that it remains watertight, or preserves the impervious nature of subduct 48. However, in the present invention no splice to sinkable cables 28 and 30 resides at the location where subduct 48 and fiber optic cable 40 are spliced. Consequently, the splicing of subduct 48 and fiber optic cable 40 is a much simpler operation than would be required if an additional splicing operation to cables 28 and/or 30 were to occur in the common location.

FIG. 4 additionally shows a strand splice 54 in sinkable cable 28. Splice 54 is formed in a conventional manner so that the tensile strength of cable 28 is preserved. In other words, splice 54 does not form a weak point in sinkable cable 28. As shown in FIG. 4, splice 54 occurs in a location where neither subduct 48 nor fiber optic cable 40 are spliced. Consequently, such a splice is more easily formed and more effective than if such a splice were required at the same location where splices 50 and 52 are formed. Although sinkable cable 30 (see FIGS. 1-3) is not shown in FIG. 4, sinkable cable 30 may also be spliced. The location of a strand splice for sinkable cable 30 in the preferred embodiment is offset from splices 50, 52, and 54.

In summary, the present invention provides a relatively inexpensive submarine fiber optic cable assembly and method of installing fiber optic cable underwater. Fiber optic cable assembly 16 does not experience detrimental attenuation effects caused by electrolysis of metallic components. In addition, cable assembly 16 exhibits a high tensile strength so that it may be disturbed without damaging cable assembly 16. Moreover, cable assembly 16 exhibits a sufficiently high weight-to-buoyancy ratio with respect to body of water 14 so that it tends to remain in place once installed. Furthermore, cable assembly 16 may be spliced using conventional techniques in a manner which saves time, compared to splices in conventional submarine fiber optic cables. Still further, the present invention provides a cable assembly 16 which is installed using longer unspliced section lengths, compared to conventional submarine fiber optic cables. Attenuation and installation time improvements result.

The present invention has been described above with reference to a preferred embodiment. However, those skilled in the art will recognize that changes and modifications may be made in this preferred embodiment without departing from the scope of the present invention. For example, those skilled in the art will recognize that by design and selection choices for the dimensions for sinkable cables 28 and 30, any number of sinkable cables and/or electrical conductor cables may be attached to subduct assembly 20 to achieve a desired weight-to-buoyancy ratio. Moreover, those skilled in the art will recognize that alternate materials and dimensions to those discussed above would be acceptable for the purposes of the present invention. These and other changes and modifications which are obvious to those skilled in the art are intended to be included within the scope of the present invention.

What is claimed is:

1. A cable assembly for installation underwater, said assembly comprising:
   a fiber optic cable of a predetermined length;
   a non-conductive subduct surrounding said fiber optic cable throughout said predetermined length;
   at least one sinkable cable residing substantially parallel to said subduct throughout said predetermined length; and
   means for attaching said sinkable cable to said subduct throughout said predetermined length, said sinkable cable and said attaching means together exhibiting, with respect to water, a weight-to-buoyancy ratio that is greater than one.

2. A cable assembly as claimed in claim 1 wherein said subduct is substantially impervious to water.

3. A cable assembly as claimed in claim 1 wherein said subduct is configured so that when said cable assembly is installed underwater, said subduct substantially isolates water proximate said sinkable cable from said fiber optic cable.

4. A cable assembly as claimed in claim 1 wherein said subduct is comprised substantially of polyethylene.

5. A cable assembly as claimed in claim 1 wherein said subduct is dimensioned so that an outside diameter thereof is less than approximately 1.5 inches.

6. A cable assembly as claimed in claim 1 wherein said at least one sinkable cable comprises two sinkable cables, each of said two sinkable cables residing substantially parallel to said subduct throughout said predetermined length, and each of said two sinkable cables being attached to said subduct by said attaching means.

7. A cable assembly as claimed in claim 1 wherein said at least one sinkable cable is comprised of a corrosion resistant material.

8. A cable assembly as claimed in claim 7 wherein said at least one sinkable cable is comprised of galvanized steel.

9. A cable assembly as claimed in claim 1 wherein said at least one sinkable cable is configured so that a foot of said at least one sinkable cable weighs at least approximately 0.3 pounds more than the buoyancy of said sinkable cable with respect to water.

10. A cable assembly as claimed in claim 1 wherein said at least one sinkable cable exhibits a sufficiently high tensile strength so that when said cable assembly is installed underwater, a single point of said cable assembly can be raised to the water surface without breaking said cable assembly.

11. A cable assembly as claimed in claim 1 wherein said means for attaching comprises a lashing wire surrounding each of said at least one sinkable cable and said subduct.

12. A cable assembly as claimed in claim 11 wherein a multiplicity of substantially uniformly spaced revolutions of said lashing wire surrounds said subduct and said at least one sinkable cable throughout said predetermined length.

13. A cable assembly as claimed in claim 11 wherein said lashing wire comprises a corrosion resistant material so that said at least one sinkable cable remains securely attached to said subduct when said cable assembly is installed underwater.

14. A cable assembly as claimed in claim 13 wherein said lashing wire is comprised of stainless steel.

15. A cable assembly as claimed in claim 1 wherein said fiber optic cable consists essentially of materials which resist electrolysis.

16. A cable assembly as claimed in claim 15 wherein said fiber optic cable consists essentially of non-metallic materials.

17. A cable assembly as claimed in claim 1 wherein:
said fiber optic cable comprises a fiber optic splice within said predetermined length;
said subduct comprises a subduct splice within said predetermined length, said subduct splice being positioned within said predetermined length to coincide with said fiber optic splice, and said subduct splice being substantially impervious to water.

18. A cable assembly as claimed in claim 17 wherein said at least one sinkable cable comprises a strand splice, said strand splice being configured to preserve a tensile strength parameter of said at least one sinkable cable and to reside offset from said subduct splice within said predetermined length.

19. A submarine fiber optic cable assembly having a standard subterranean fiber optic cable therein, said cable assembly comprising:
a non-conductive subduct which is substantially impervious to water, said subduct enclosing said fiber optic cable so that an environment outside of said subduct is substantially isolated from said fiber optic cable;
at least one steel strand attached to and positioned substantially parallel to said subduct, said at least one steel strand exhibiting sufficiently high density and weight so that said cable assembly exhibits, with respect to water, a weight-to-buoyancy ratio that is significantly greater than one.

20. A cable assembly as claimed in claim 19 wherein said subduct is comprised substantially of polyethylene.

21. A cable assembly as claimed in claim 19 wherein said at least one steel strand comprises two steel strands each of said two steel strands residing substantially parallel to said subduct.

22. A cable assembly as claimed in claim 21 wherein said at least one steel strand exhibits a sufficiently high tensile strength so that when said cable assembly is installed, a single point of said cable assembly can be raised to the water surface without breaking said cable assembly.

23. A cable assembly as claimed in claim 19 additionally comprising a lashing wire wrapped around said subduct and said at least one steel strand so that a multiplicity of substantially uniformly spaced revolutions of said lashing wire are positioned along said cable assembly.

24. A cable assembly as claimed in claim 23 wherein said lashing wire is comprised of stainless steel.

25. A cable assembly intended for use in submarine installations, said cable assembly comprising:
a fiber optic cable consisting essentially of non-metallic materials and being of a predetermined length;
a polyethylene subduct which is substantially impervious to water and which surrounds said fiber optic cable throughout said predetermined length;
at least one galvanized steel strand residing substantially parallel to said subduct throughout said predetermined length; and
a stainless steel lashing wire wound around said subduct and said at least one strand so that a multiplicity of revolutions of said lashing wire are wound throughout said predetermined length, said at least one strand and said lashing wire together exhibiting sufficiently high density and weight to cause said entire assembly to exhibit, with respect to water, a weight-to-buoyancy ratio that is significantly greater than one.

* * * * *